(12) United States Patent
Verhaeghe

(10) Patent No.: US 7,905,072 B2
(45) Date of Patent: Mar. 15, 2011

(54) SUPPORT PANEL STRUCTURE

(75) Inventor: Jan Verhaeghe, Beveren (BE)

(73) Assignee: Groep Stevens International, Lokeren (BE)

( * ) Notice: Subject to any disclaimer, the term of this patent is extended or adjusted under 35 U.S.C. 154(b) by 308 days.

(21) Appl. No.: 11/913,565

(22) PCT Filed: May 4, 2006

(86) PCT No.: PCT/EP2006/062050
§ 371 (c)(1),
(2), (4) Date: Aug. 15, 2008

(87) PCT Pub. No.: WO2006/117395
PCT Pub. Date: Nov. 9, 2006

(65) Prior Publication Data
US 2009/0212533 A1  Aug. 27, 2009

(30) Foreign Application Priority Data

May 4, 2005  (EP) .................................... 05447103

(51) Int. Cl.
*B32B 5/20* (2006.01)
(52) U.S. Cl. ......... 52/783.1; 156/181; 428/119; 280/789
(58) Field of Classification Search ................ 52/782.1, 52/783.1; 156/148, 181, 166; 428/119; 280/789
See application file for complete search history.

(56) References Cited

U.S. PATENT DOCUMENTS

| 6,158,773 A | 12/2000 | Verhaeghe |
| 6,634,673 B1 | 10/2003 | Verhaeghe |
| 6,676,785 B2 * | 1/2004 | Johnson et al. ................. 156/92 |
| 2002/0144767 A1 | 10/2002 | Johnson et al. |
| 2003/0001376 A1 | 1/2003 | Verhaeghe |
| 2003/0184974 A1 | 10/2003 | Atkinson et al. |
| 2005/0260379 A1 | 11/2005 | Verhaeghe |
| 2005/0271852 A1 | 12/2005 | Solomon et al. |
| 2006/0121244 A1 | 6/2006 | Godwin et al. |

FOREIGN PATENT DOCUMENTS

| EP | 1596029 | 11/2005 |
| WO | WO 9919137 | 4/1999 |

* cited by examiner

*Primary Examiner* — Kevin Hurley
(74) *Attorney, Agent, or Firm* — Novak, Druce & Quigg LLP

(57) ABSTRACT

A support panel structure includes at least one panel which extends in longitudinal and cross direction of the support panel structure and essentially forms one integrated structure, which integrated structure is at least partly built up of at least one composite resin laminate building block comprising at least a first and a second face sheet of a fibrous reinforced material with sandwiched in between a sheet of a foamed core material, wherein the first and second face sheet and the sheet of core material are mutually connected by means of fibrous reinforcing material at least part of which extends in height direction of the resin laminate building block, further with the support panel structure including in height direction a multiplicity of composite resin laminate building blocks stacked on top of each other and bonded to each other, at least a first and a second superposed resin laminate building blocks which sandwich between them a layer of a foamed material, the resin laminate building blocks and foamed material being adhered to each other.

18 Claims, 6 Drawing Sheets

SUPPORT PANEL STRUCTURE

CROSS-REFERENCE TO RELATED APPLICATIONS

This application is the entry into the United States of PCT Application Number PCT/EP2006/062050 filed May 4, 2006 and claims priority from European Patent Application No. 05447103.2 filed May 4, 2005, the entirety of each of which is hereby incorporated by reference.

BACKGROUND

The invention relates to a support panel structure comprising at least one panel which extends in longitudinal and cross direction of the support panel structure and essentially forms one integrated structure, which integrated structure is at least partly build up of at least one composite resin laminate building block comprising at least a first and a second face sheet of a fibrous reinforced material with sandwiched in between a sheet of a foamed core material, wherein the first and second face sheet and the sheet of core material are mutually connected by means of fibrous reinforcing material at least part of which extends in height direction of the resin laminate building block, according to the preamble of the first claim.

Nowadays, practically all over the world, trucking has become one of the most important modes of transportation for goods. The inherent design of a towed trailer is long in length and narrow in width, with a high center of gravity when loaded. The trailer is usually connected to a towing truck by means of a kingpin and fifth wheel system or a kingpin and gooseneck hitch mechanism. In a gooseneck hitch mechanism, a downwardly pointing kingpin is rigidly mounted to the front of the long, curved tongue portion on the trailer, which generally has the shape of a gooseneck. The kingpin is adapted to fit into the hitch plate of the truck to which the trailer is being hitched.

The main bearing members for loads placed on vehicles, such as for instance flatbed or semi-trailers, are the pair of I-beams, generally known as the "main beams" or main runners which are made of steel and run longitudinally of the vehicle. In order to be able to offer support for loads, such as for instance containers, usually steel floor supports in the form of a multiplicity of cross members are mounted to the bottom side of the undercarriage. These cross members are bolted or welded perpendicularly to the webs of the main runners and define the width of the bed. On top of the structure formed by the longitudinal and cross members, a floor is provided, of which the floor sections are typically welded to each other along their longitudinal sides or butted against each other and held in position by special guiding means and floor screws.

WO-A-9947406 discloses a flatbed trailer that unitizes the floor, the longitudinal runners and the cross runners, to provide a lightweight, though strong trailer. However, there are several problems associated with this type of known trailer. Extensive welding of the cross members and floor sections to the main runner which extends over the whole length of the loading floor, not only reduces the load bearing strength of the complete floor structure and the loading height capacity but also adds considerable weight, and therefore requires a substantial sacrifice in load capacity. Even when materials such as for instance low density aluminum are used to increase load capacity, this attempt is defeated by the extensive welding, which is time consuming and costly, and tends to minimize payload. Moreover, since the floor is build up of essentially loose floor sections, they contribute very little to the load bearing function.

There is a general trend in the transport industry to decrease the empty chassis weight as much as possible. As the European legal limit of the total weight of a truck is 40 ton, reducing the weight of the trailer would permit increasing the load capacity.

EP-A-967.139 discloses a semi-trailer with a wheeled chassis which is lightweight to provide optimum load carrying capacity. The chassis comprises a pair of spaced-apart longitudinal runners, which extend over the entire length of the trailer. At the front portion, the chassis runners are bow shaped and they extend around the ends of a forward transverse runner. The runners taper inwardly towards the rear chassis portion, to finally run parallel, three wheel axle assemblies being mounted between them in the rear chassis portion. The runners also taper inwardly towards the front portion, so that the rubbing plate assembly can be directly mounted to the runners without the need for additional reinforcement, thus saving weight. The semi-trailer disclosed in EP-A-967.139 is suitable for use with a goose-neck as well as flat construction at its front end. However, it is made of metal and does not comprise a trailer floor.

SUMMARY

The aim of the present invention is to provide a light weight support panel structure, which shows an improved mechanical strength as compared to existing support panel structures, in particular an improved resistance to bending and breaking, and which is suitable for use as a trailer floor.

This is achieved according to the present invention with a support panel structure showing the technical features of the characterizing portion of the first claim.

Thereto, the support panel structure of this invention is characterized in that the support panel structure comprises in height direction at least a first and a second superposed resin laminate building block which sandwich between them a layer of a foamed material, the resin laminate building blocks and foamed material being adhered to each other.

The inventor has surprisingly found that superposed resin laminate building blocks which sandwich between them a core of a foamed material show improved mechanical strength as compared to stacked resin laminate building blocks. In particular, the support panel structure of this invention has been found to show an improved resistance to bending and an improved capacity of absorbing load exerted to its surface within the panel structure. This has the result that the support panel structure of this invention is suitable for use in any construction that is subjected to dynamic loads, such as for example trailers, bridge decks, parking decks, roofs, boats, airplane wings etc. The inventor has also found that the support panel structure of this invention is resilient in thickness direction, which means that in case a downwardly pointing force is exerted to the top face of the structure, this force is absorbed by a resilient bending and finally a returning of the structure to its original form and position. The inventor has further surprisingly found that the support panel structure of the present invention shows an improved resistance to point loads as compared to existing composite structures. This is important as it permits the use of the support panel structure of this invention as a support floor in trucks and trailers having support legs for supporting the weight of the trailer in a lifted position, i.e. where the trailer is no longer supported by its wheels. This is further important as it permits positioning the support legs at any convenient position, with respect to other constructional parts of the trailer.

The laminate building block of this invention may be suitably used for the production of support panel structures with large dimensions, typically up to a few to 20, or even 50 meters and more. Also, the support panel structure of the present invention is suitable for use as a mounting surface, which may be produced as a single piece, in a continuous process. This reduces production cost considerably.

The support panel structure of the present invention when used in a trailer provides the majority of the required bending strength and stiffness to the trailer. The remaining parts, for example the longitudinal runners need to contribute to a minimum extent only. This has the consequence that the dimensions of the longitudinal runners in height direction of the trailer may be significantly reduced, moreover that the presence of longitudinal runners at a position in a front part of the trailer which is not carrying the substantial part of the load or does not support any load at all may be even dispensed with. Because of the improved strength of the support panel structure of the present invention, thickening and special shaping of the front end of the trailer in the shape of a gooseneck can be dispensed with, without adversely affecting the load and force absorbing properties at the position of the connection. In prior art trailer construction, the gooseneck was present to keep the distance between the wheels and the trailer floor as small as possible, in view of maximizing the available loading height. The purpose of the gooseneck was also to minimise the amount of metal present in the trailer. With the present invention on the other hand, a virtually all-composite trailer may be constructed, as a consequence of which the position of the support floor with respect to the wheels may be varied without substantially affecting the weight of the trailer.

A preferred embodiment of this invention is characterized in that the support panel structure comprises a multiplicity of composite resin laminates stacked on top of each other and bonded to each other to form a stiff super sandwich assembly.

If so desired, to increase the thickness and the load bearing capacity, the support panel structure may comprise multiple composite resin laminate building blocks and additional sheets of foamed material sandwiched between consecutive composite resin laminate building blocks, stacked on top of each other and bonded to each other to form a stiff super sandwich assembly. Further improvement of the mechanical properties of the support panel structure of this invention is obtained in case the multiplicity of the stacked composite resin laminate building blocks and foamed material sandwiched between them, are over-wrapped with a fibrous reinforcing material and preferably impregnated with at least one resin.

Another preferred embodiment of this invention is characterised in that in the interior of at least one of the resin laminate building blocks, at least one reinforcing structure is provided which extends in height direction and in at least one of the longitudinal and/or transverse direction of the support panel structure. The at least one reinforcing structure is provided to function as a reinforcement for the integrated structure to counteract bending of the over-all support panel structure at least at the position of the reinforcing structure in at least one extending direction of the reinforcing structure. The presence of the reinforcing structures has the result that an essential part of the reinforcement which has to provide load bearing capacity as well as resistance against bending is integrated within the interior of the support panel structure. In this respect the inventor has found that a shock exerted in a direction perpendicular to the reinforcing structure, may be absorbed in the interior of the reinforcing structure by a local deformation, often a local bending at the position of the reinforcement, the deformation in adjacent areas decreasing with increasing distance from the point where the shock has been exerted. In other words, the inventors have observed that the support panel structure is locally compressible in the direction perpendicular to the direction in which the reinforcement extends. Since the reinforcing structures are mounted within the interior of the integrated structure, for the first time a support panel structure is provided, which is suitable for use as a mounting surface and which may be produced as a single piece, in a continuous process. This reduces production cost considerably.

The presence of such reinforcing structures has been found to further improve the stiffness of the over-all support panel structure and to provide local shock absorbing properties. Thereby it has been found that the improved stiffness is not limited to the direction in which the reinforcing structures extend, but that it extends to a wide variety of other directions. It has further been found that the presence of the claimed reinforcing structures contributes to decreasing the shear forces occurring in the panel, the occurrence of shear forces being inherent to the presence of the top and bottom layer. Shear forces appear to be particularly important with a panel made of a foamed plastic, and to involve the formation of unwanted smaller or larger cracks in the foam. The presence of the claimed reinforcing structures further contributes to improving the resistance of the panel against fatigue and therefore also of the floor parts, where the panels with reinforcing structures have been applied. Fatigue stresses often entail an unwanted weakening and deflection of a sandwich panel.

Optimum reinforcement at specific positions may be obtained in case the support panel structure comprises at least a first and a second composite resin laminate building block sandwiching between them at least one layer of a foamed core material, in that in the interior of the first and second composite resin laminate building block respectively a first and a second reinforcing structure is provided, the first and second reinforcing structures being inserted at corresponding positions in height direction of the structure.

The support panel structure of this invention can be built in such a way that it is capable of functioning as a shock or force absorber. In that case the support panel structure preferably comprises in the vicinity where the shock or force is exerted to the panel, at least one reinforcing structure which extends in the direction of the force exerted to the panel, and at least one reinforcing structure which extends in a direction perpendicular thereto. Preferably a plurality of such reinforcing structures is mounted into the interior of the structure. When the support panel structure is subjected to a shock, this shock may be absorbed by a local deformation of the panel structure as described above.

If it is desired to counteract bending of the support panel structure at a position between fastening means for fastening a load to be carried by the support panel structure for example when the structure of this invention is used as a mounting surface in a trailer, fastening means are mounted to opposite longitudinal sides of the support panel structure and at least one reinforcing structure is provided in the interior of the integrated structure, which reinforcing structure spans at least part of the distance between opposite fastening means and extends in at least one direction perpendicular thereto.

According to a preferred embodiment, the support panel structure of this invention may take the form of a support floor for example for a vehicle with connecting means for connecting it to a towing vehicle are integrated in the at least one panel. Thereby it is particularly preferred that at least one reinforcing structure is integrated into the interior of the panel at the position of the connecting means, and that the at least one reinforcing structure extends mainly in a direction in which the support floor is to be towed and in at least one direction perpendicular to the towed direction.

With these embodiments an all-component containing support floor is provided with integrated connecting and shock and force absorbing means, an improved strength and stiffness at the position of the connecting means, an improved attachment of the connecting means to the support floor which is less subject to loosening, as any forces exerted to the connection may be absorbed by the locally reinforcing structures. Moreover, the connecting means and shock absorbing function may be integrated in the support floor in the course of the floor production process, without requiring an additional process step, which results in a further cost reduction.

The present invention also relates to a support panel structure which is suitable for use with a vehicle chassis, which is lightweight and permits to maximize payload.

The support panel structure of the present invention is suitable for use with any vehicle known in the art, but is particularly suitable for use in an all composite trailer. The support panel structure of the present invention is for example suitable for use in a flatbed chassis, a trailer for transporting containers, a tipper chassis, a chassis for refrigerated trailer, a chassis for conventional use with curtain side trailers or dry vans. The support floor of the present invention is also suitable for use as a floor for a caravan, a motor home and so on. Because of its extreme shock and force absorbing properties, the support panel structure is also suitable for use as a floor for transport means travelling at high speed, for example trains and high velocity trains, as this structure is capable of absorbing intense break forces when stopping the train within the interior of the structure.

The present invention also relates to a lightweight panel support structure suitable for use in a trailer, which permits to maximise payload of the trailer. Such a lightweight structure is characterized in that it comprises at least one panel which extends in longitudinal and transverse or cross direction and essentially forms one integrated structure, in that the integrated structure is at least partly build up of at least one composite resin laminate building block comprising at least a first and a second face sheet of a fibrous reinforced material with sandwiched in between a sheet of a core material, wherein the first and second face sheet and the sheet of core material are mutually connected by means of fibrous reinforcing material, at least part of which extends in height direction of the laminate building block, in that in the interior of the integrated structure at least one reinforcing structure is provided which extends in height direction and in at least one of the longitudinal and/or transverse direction of the support floor and in that the at least one reinforcing structure is provided to function as a reinforcement for the integrated structure to counteract bending of the at least one panel at least at the position of the reinforcing structure in at least the direction in which the reinforcing structure extends.

The inventor has further found that in using a composite resin laminate as a building block, a support panel structure may be obtained with an improved stiffness and bending strength when compared to the conventionally used metal floors and at a substantially reduced weight.

It is a further object of the invention to provide a lightweight chassis including this support panel structure and a method for producing the support panel structure.

Thereto, the present invention further relates to a continuous, economically feasible method for producing a the above described reinforced support panel structure. The method of this invention is characterised in that it comprises the steps of providing a core of a foamed material, inserting within the foamed material at least one reinforcing structure, applying a sheet of a first and a second fibrous reinforced material to opposite faces of the core material comprising the at least one reinforcing structure to form a laminate, connecting the first and second fibrous reinforced material and the core comprising the at least one reinforcing structure using a substantially continuous fibrous reinforcing material, where at least part of the fibrous reinforcing material extends in Z-direction of the laminate, impregnating the laminate with a resin by means of pulltrusion and curing the impregnated laminate, and mounting and bonding a foamed material between two opposite of thus produced panel structures.

The technique of tufting appears to be particularly suitable for establishing the connection of the first and second fibrous reinforced material and the core and the at least one reinforcing structure. Tufting in particular permits to interconnect stacked layers along multiple longitudinal rows over a large width of the laminate. The inventor has further found that tufting, which is a continuous connection technique, is particularly suitable for use with the step-wise process of pulltrusion as it permits advancing the sandwich structure by the pulling device at the time the tufting needles are raised from the sandwich structure in the course of tufting.

The present invention also relates to a lightweight trailer comprising the above described support panel structure.

In the trailer of this invention the support panel structure is preferably mounted to a chassis, which comprises at least two opposite longitudinal runners made of a fibrous reinforced resin, at least one cross tie made of a fibrous reinforced resin having its opposite end parts connected to a side of the opposite longitudinal runners, the chassis further comprising at least one set of wheels connected to each other by means of an axle, opposite end parts of the axle being suspended to opposite longitudinal runners. Surprisingly the inventor has found that this all composite trailer hardly shows any fatigue. To further improve fatigue resistance, it may be preferred to also make the axle and the axle suspension means of composite material.

BRIEF DESCRIPTION OF THE FIGURES

The invention is further elucidated in the accompanying figures and description of the figures.

DETAILED DESCRIPTION

Figure 1:
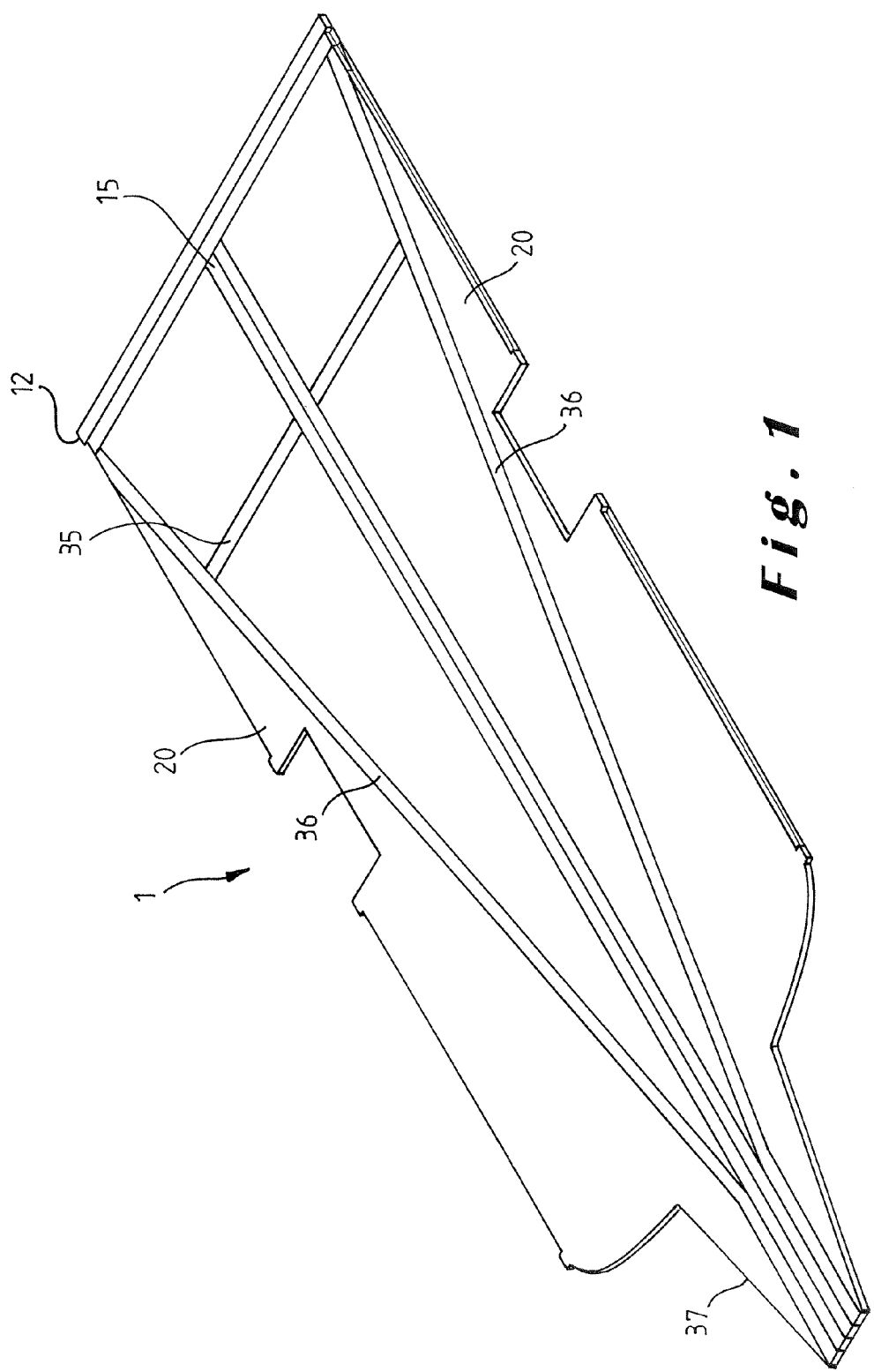
FIG. 1 is a view to the interior of an embodiment of the support panel structure of this invention containing the reinforcing structure.

The support panel structure of the present invention, a possible embodiment of which is shown in FIG. 1, comprises at least one panel 16 which extends in longitudinal and cross or transverse direction. The shape and dimensions of the panel are not critical to the invention and may be adapted by the person skilled in the art taking into account the intended use of the support floor.

As can be seen from FIG. 1 the support floor essentially forms one integrated structure. The integrated structure is build up at least partly of composite resin laminate building blocks 17. Therein each laminate building block comprises at least a first top face sheet and a second bottom face sheet of a fibrous reinforced material with sandwiched in between a sheet of a core material, preferably a foamed material. The first and second face sheet and the sheet of core material are mutually connected by means of fibrous reinforcing material, at least part of which extends in height direction of the laminate. The fibrous reinforcing material may run substantially perpendicular to the first and second face sheet or extend under an angle which is smaller or larger than 90°.

A suitable composite resin laminate for use in the support floor according to the invention is for instance disclosed in PCT/BE03/00092, which is hereby incorporated by reference. The sandwich panel disclosed in PCT/BE03/00092 is preferred as it is stiff, strong, light and affordable and may be made according to a continuous economically feasible process, which involves pulltrusion. Nevertheless, other composite resin laminates known to the skilled person may also be used.

The nature of material from which the core of the composite resin laminate is made is not critical to the invention. Mostly, use will be made of a foamed plastic material, for example foamed polyethylene, polypropylene, polyurethane, ethylene-propylene copolymer, polyvinylchloride. The core can however also be entirely made of a foamed metal or a metal containing foam, or may be a combination of a foamed plastic material, a foamed metal and/or a metal containing foam. The use of polyvinylchloride foam is preferred as it is a relatively cheap material, which is readily industrially available and has a sufficiently high thermal resistance to withstand oven temperatures used to cure the resin with which the laminate is impregnated. Although this type of foam may be rather light, the reinforcement provided by the presence of the tufting fibres provides the required strength in z-direction, i.e. the height direction.

It is however also possible to use as the core material two or more stacked layers of foamed material, which may sandwich between them a layer of a fibrous reinforcing material or not. Stacked foam layers may be made of the same material or of different materials. The nature of the fibrous reinforcing material sandwiched between two foamed cores is not critical to the invention, although it is preferred to use a fabric or a mat of a woven or non-woven material. The core material may be used in the form of a plurality of individual prefabricated foam plates. It is however also possible to manufacture the foamed cores in-situ, i.e. when producing the composite resin laminate panels.

Figure 3:
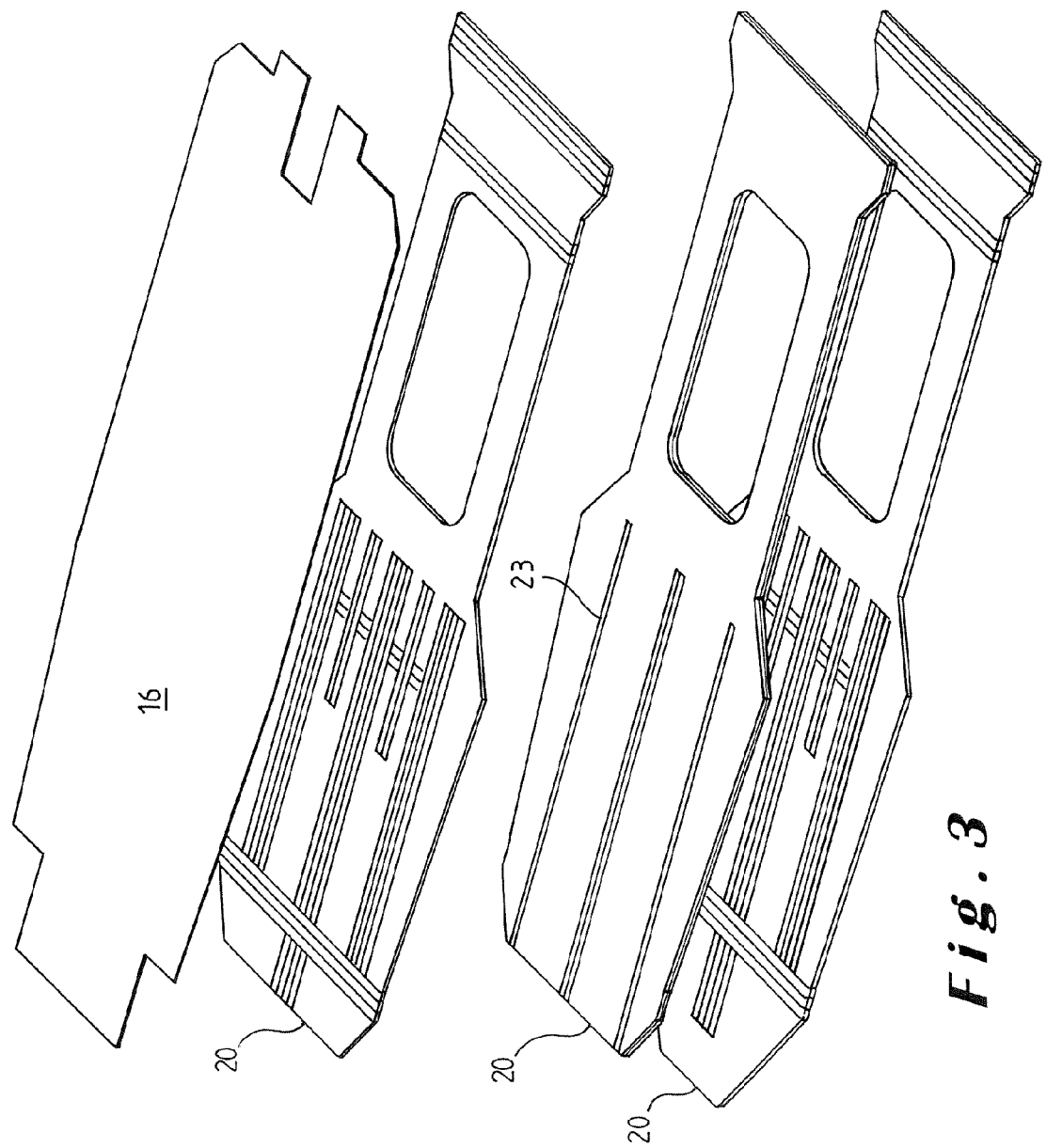
FIG. 3 shows the composition of the support panel structure of FIGS. 2a and 2b, with the reinforcement structures.

Additionally, a first and a second composite resin laminate, sandwiching between them a layer of a foamed material may be stacked on top of each other and adhered to each other. Also multiple composite resin laminates may be bonded on top of each other in order to create a panel of a "multilayered super-sandwich" for use in the support panel structure of this invention consisting of individual sandwich panels as is schematically shown in FIG. 3. The support panel structure is preferably produced by bonding a number of sandwich and/or foam panels together and shaping them into the envisaged shape. This shaping process can occur with simple tools, known in the art. Following the shaping of the individual panels, the panel assembly is preferably over-wound by using filament winding, but braiding, and hand and automated tape and roving deposition processes may also be used.

According to a preferred embodiment, the integrated support panel structure comprises at least one reinforcing structure 11-15 which is integrated in the interior of the resin laminate building blocks or the sandwich structure, in particular within the foamed core material, to optimise load carrying properties. It is however possible within a "multi-layered super-sandwich" that only panel, part or all of the panels of the assembly contain the reinforcements.

The reinforcing structure may be made of a wide variety of materials, for example steel, stainless steel, iron or any other metal ought suitable by the person skilled in the art. The reinforcing structure may also be made of a plastic material, for example a thermosetting resin or a thermoplastic material or a fibrous reinforced thermosetting resin or thermoplastic material. The at least one reinforcing structure may also comprise a foamed metal or plastic material which is enveloped in a fibrous reinforcing material, a steel or metal net, a three dimensional grid made of metal or steel, a honeycomb-like structure made of fibrous reinforcing material or steel, a strip or plate, perforated or not, or any other suitable reinforcing structure or material known to the person skilled in the art. The reinforcing structure may be made as a mainly flat or pre-shaped strip, plate, net or grid. The reinforcing structure may for example be made as a zig-zag extending strip, whereby subsequent reinforcing structures extend parallel to each other, or point towards or from each other. The reinforcing structure may have the shape of a wave, a rectangular or square wave, or any other shape ought suitable by the person skilled in the art. The reinforcing structure may comprise a plurality of reinforcing structures arranged parallel to each other within the composite resin laminate or in a staggered arrangement or any other suitable arrangement. However, the reinforcing structure is preferably made of composite material and extends in height direction of the composite resin laminate panel and in at least one of the longitudinal and/or transverse direction. Preferably, the reinforcing structure is inserted in the core of the composite resin laminate.

The reinforcing structure may take any shape considered suitable by the person skilled in the art, but preferably however takes the shape of a single block or multiple blocks, panels, tubes or enveloped blocks, a plate or grid which extend in height direction of the support panel structure, or any other reinforcement which extends in height direction of the laminate building block. The reinforcing structure may extend over substantially the entire length and width of the laminate building block, or be present at one or multiple discrete positions. The reinforcing structure may have the same or a smaller thickness as the laminate building block, it may have the same or a smaller thickness as the core material. The reinforcing structure may be integrated within the core material in the course of producing the latter or it may be inserted into the finished core material.

A suitable example of such a reinforcing structure is a block comprising a foamed material, for example a foamed plastic or metal or a mixture of these materials, which is received in an envelope of fibrous reinforcing material. To facilitate production, the reinforcing structure will usually be provided when producing the panel, and will be impregnated with the thermosetting resin or a thermoplastic material used in the production of the panel, and impregnated at the time of impregnating the panel. Suitable thermosetting materials for use in the present invention include thermosetting unsaturated polyester resins, vinylester resins, epoxy resins, phenolic resins, polyurethane resins.

The reinforcing structure may have the same or a smaller height compared to the height of the sandwich panel. To save material without compromising the stiffness of the resin laminate panel, it is also possible to have subsequent reinforcing structures depend in an alternating fashion from the top layer of the composite resin laminate, from its bottom layer, and countersunk within its core, taken in cross direction thereof. The reinforcing structure may however also extend from the top and bottom layers. In that case, the end parts of the reinforcing structure will protrude from the top and bottom layer of the laminate, and may be bent to follow the surface of the top and bottom layers.

The reinforcing structure may extend in longitudinal and/or in transverse direction of the sandwich panel, depending on the envisaged loading pattern of the panel. It is however also possible that the reinforcing structure extends at an angle with the longitudinal direction of the sandwich panel, when viewed from above.

Figure 5:
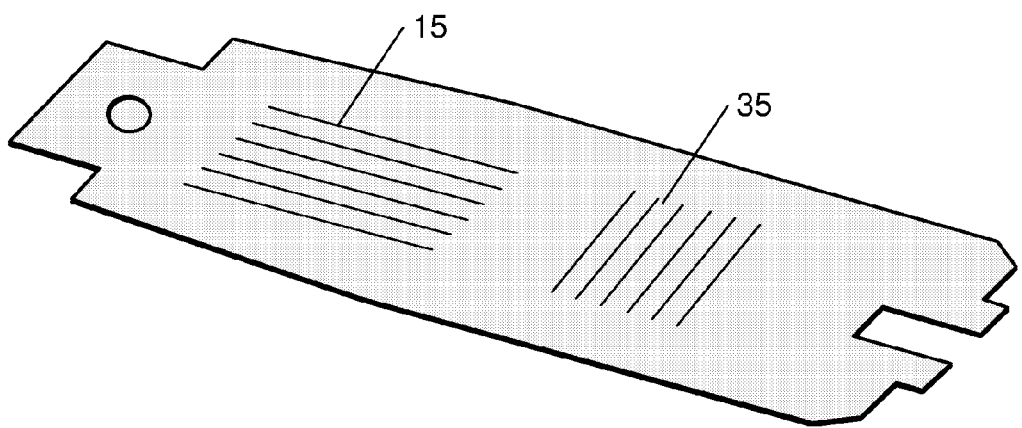
FIG. 5 shows a cross section of a shock absorbing panel support structure.
Figure 6:
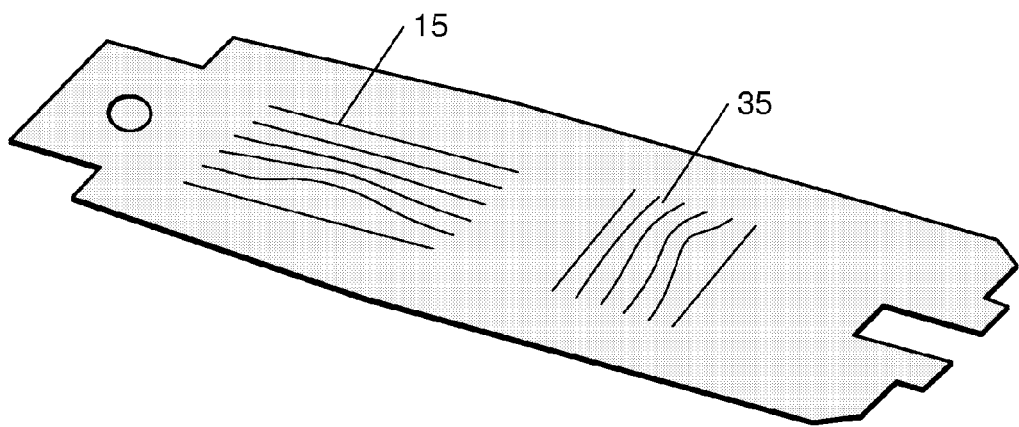

If it is the object of providing a panel structure which is shock absorbing or capable of absorbing forces as is shown in FIGS. 5 and 6, in the vicinity of a position where the forces are expected to occur, in the interior of at least one of the first and second composite resin laminate building block at least one third reinforcing structure is provided which extends in the direction of the force exerted to the panel, and at least one fourth reinforcing structure which extends in a direction perpendicular thereto. Preferably however a plurality of parallel extending third reinforcing structures next to one another are mounted into the interior of the panel structure, and a plurality of parallel fourth reinforcing structures next to one another. For example in the vicinity of the kingpin, a plurality of parallel, adjacent reinforcing structures may be provided, the longitudinal axis of which extends in longitudinal direction of the support structure, which is in the direction in which brake forces are exerted to the trailer. Those reinforcing structures will absorb longitudinal brake forces by showing local deformation (local bending), which deformation decreases with increasing distances from the force. In that way the brake force is absorbed by the surrounding part of the support structure. In the further part of the support structure a plurality of parallel reinforcing structures are provided, which extend in transverse direction of the support structure. Preferably those reinforcing structures have a length that at least spans the width covered by the longitudinal reinforcing structures. The transverse reinforcing structures introduce local resiliency and the ability of the panel structure to deform locally in longitudinal direction, whereby the deformation is absorbed by the neighbouring structure, in such a way that the risk to an over-all deformation of the panel structure is minimal. If so desired however, local over-all deformation may be permitted. In that way they are capable of absorbing and neutralising the longitudinal forces transferred to them. Thus a support panel structure is provided which shows intrinsic resiliency. The above described reinforcing structures may however be provided at several positions and in one or more of the laminate building blocks.

If it is the aim to improve the strength of the support panel structure on a side which is to be subjected to more severe circumstances, it is preferred to additionally reinforce the sandwich or the core of foamed plastic material with a fibrous reinforcing mat or fabric which comprises metal fibres. The inventor has found that the use of metal fibre containing fabrics or mats improves the pressure resistance, the weight increase of the material being negligible. In the support panel structure according to the invention, for example, the side of the laminate opposite the side onto which the load or container is to be positioned will preferably comprise a metal fibre comprising fabric. The reason is that this side is likely to experience the larger (tensile) stresses.

The above-described support panel structure is suitable for use in a wide variety of applications. The support panel structure is for example suitable for use as a trailer floor as is described above, but it may also be used for the construction of containers, in particular for the construction of the top, bottom and side walls. In those containers the top wall is fastened to the bottom wall by means of side walls or the compartment may be made as one part. Such containers may be used in a wide variety of applications, for example in the construction of buildings; containers for transporting goods; cockpits for cars, trucks or trains or any other transportation means; train wagons; boat constructions etc.

Suitable resins to be used in the support panel structure and composite resin laminate of the invention may be any suitable resin used in the art of composite materials. It is for instance possible to use unsaturated polyester, vinylester and/or epoxy resin, polyurethane resin or formaldehyde resins like phenols and melamines. It is also possible to use thermoplastic resins like for instance saturated polyester (PET), polyolefines like polyethylene and polypropylene, polystyrene or copolymers thereof, polycarbonates, and so on. Thermoplastic resins are commercially available as Fulcrum, Cyclics etc.

Composites technology in general can be used to create a loading floor according to the invention. It is possible to use processes such as hand lay-up, resin transfer moulding, extrusion, filament winding and/or pultrusion, or combinations of both. Of these, pultrusion is the preferred method.

If so desired, in the interior of the panel, preferably in the foam layer one or multiple tubes or wiring may be provided, to permit establishing electric and hydraulic connections when used in combination with a towing vehicle and trailer.

The present invention further relates to a continuous method for producing the above described reinforced support panel structure. The method of this invention comprises the steps of advancing a core of a foamed material, applying a sheet of a first and a second fibrous reinforced material to opposite faces of the core material to form a laminate, connecting the first and second fibrous reinforced material and the core and the at least one reinforcing structure using a substantially continuous fibrous reinforcing material, where at least part of the fibrous reinforcing material extends in Z-direction of the laminate, impregnating the laminate with a resin by means of pulltrusion and curing the impregnated laminate, advancing a first and a second of thus obtained resin laminate structures, applying between them a layer of a foamed material and adhering the first and second resin laminates to the foamed material.

If it is the object to include in the composite resin laminate a reinforcing structure, the method of this invention comprises the steps of advancing a core of a foamed material, inserting within the foamed material at least one reinforcing structure, applying a sheet of a first and a second fibrous reinforced material to opposite faces of the core material to form a laminate, connecting the first and second fibrous reinforced material and the core and the at least one reinforcing structure using a substantially continuous fibrous reinforcing material, where at least part of the fibrous reinforcing material extends in Z-direction of the laminate, impregnating the laminate with a resin by means of pulltrusion and curing the impregnated laminate. This process presents the advantage that the reinforcing structure may comprise a fibrous reinforced resin, impregnation with the resin being carried out at the same time as impregnating the sandwich structure.

The face sheets, core and reinforcing structures are connected to each other in height direction of the panel. To establish the connection any suitable technique known to the person skilled in the art may be used, for example stitching, tufting, needling, stapling and so on, although the technique of tufting is preferred as it is a particularly fast technique, particularly suitable for use in combination with the resin impregnation through pulltrusion. In the process of tufting, a continuous fibrous material is inserted using a plurality needles disposed in transverse direction of the laminate and reciprocating in Z-direction through the laminate, while the laminate is advanced through a suitable tufting device. These devices are well known in the carpet industry. The fibrous reinforcing material is inserted from the first face sheet, through the core material and the second face sheet. The part of the fibrous reinforcing material extending through the second face sheet is temporarily withheld by a hook to form a loop, and returned through respectively the second face sheet, the core material and the first face sheet. By combining tufting and pulltrusion, fiber reinforced resin impregnated composite panels with large dimensions, in particular a long length, may be produced in a substantially continuous process. In contrast to other known connecting techniques the process of tufting, which is a continuous process may be very well used in combination with the discontinuous step-wise process of pulltrusion. In particular, each time the tufting needles are withdrawn from the laminate, the laminate may be gripped by the pullers and advanced through the pulltrusion device.

Thus, the process of this invention provides a sandwich structure, which contains fibrous reinforcement which extends in height direction or Z-direction of the panel. Thereby the fibres may extend virtually perpendicular to the face sheets of the panel or under an angle which is smaller or larger than 90°. The position of the fibres is fixed by the presence of the foamed core.

As the substantially continuous fibrous tufting material use can be made of fibrous materials in the form of tows, threads, bundles, yarns or rovings, comprising a plurality of fibre bundles or twined or torsioned fibres, which may be built up of a single material or a combination of two or more different materials.

The reinforcing fibers used in the composite resin laminate and used when over-wrapping is applied, may be but are not limited to natural fibres, such as for example metal fibres, wool, cotton, flax etc, mineral fibers, such as for example glass fibers, synthetic fibers, such as for example aramid fibers (Kevlar®), carbon fibers, graphite fibers, ultra high molecular weight polyethylene (UHMWPE) fibers, polyester, polypropylene, polyamide fibres, or mixtures of two or more of these fibres. However, because of its high impact strength, the use of aramid and/or UHMWPE fibres is preferred. Within the framework of the present invention it is however also possible to use hybrid combinations of fibers, such as for example glass and aramid fibers, or glass and polypropylene fibres.

The present invention is further elucidated in the attached figures and figure description.

FIG. 1 is a view to a top face of a layer of a support panel structure.

FIGS. 2a and 2b respectively show a view to the top and the bottom of the support panel structure of this invention.

FIG. 3 shows a possible embodiment of the support panel structure of FIGS. 2a and 2b, with composing parts taken apart.

Figure 4A:
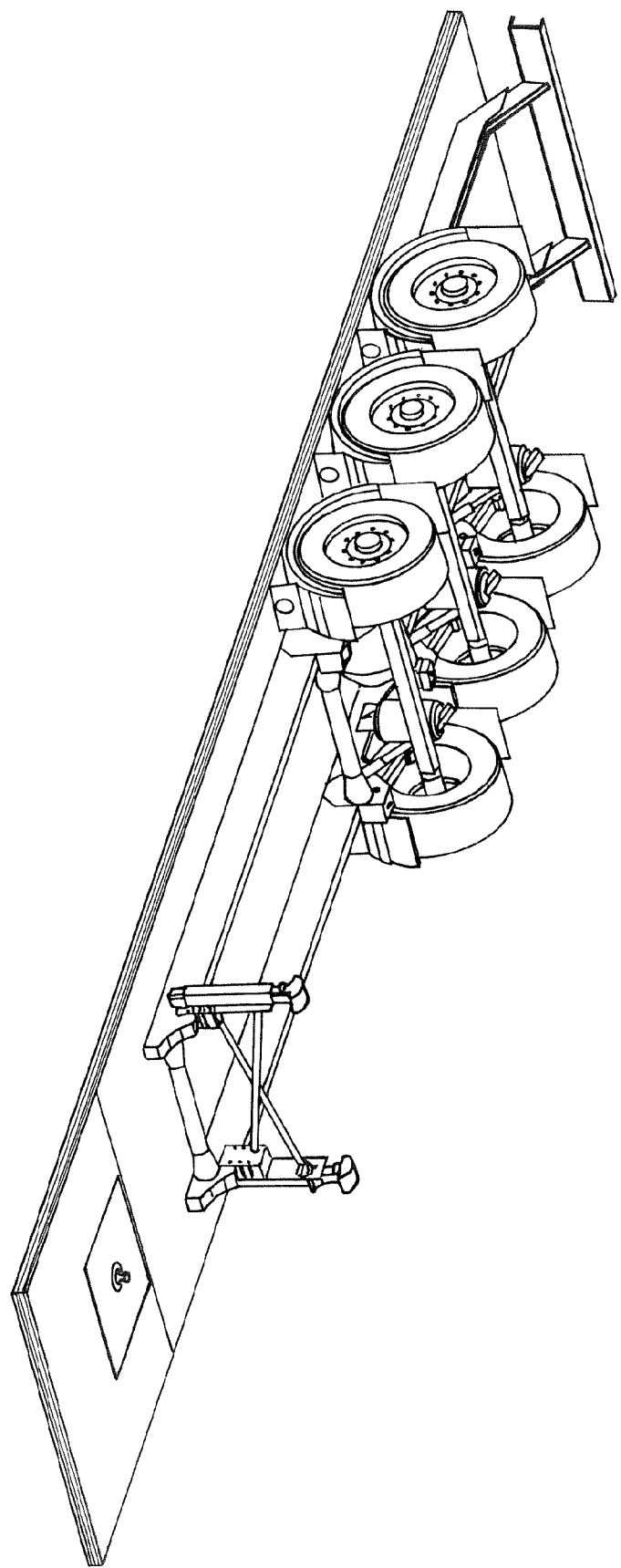
FIGS. 4a and 4b respectively show a view to the bottom and the top of an embodiment of a trailer comprising the support panel structure of this invention.
Figure 4B:
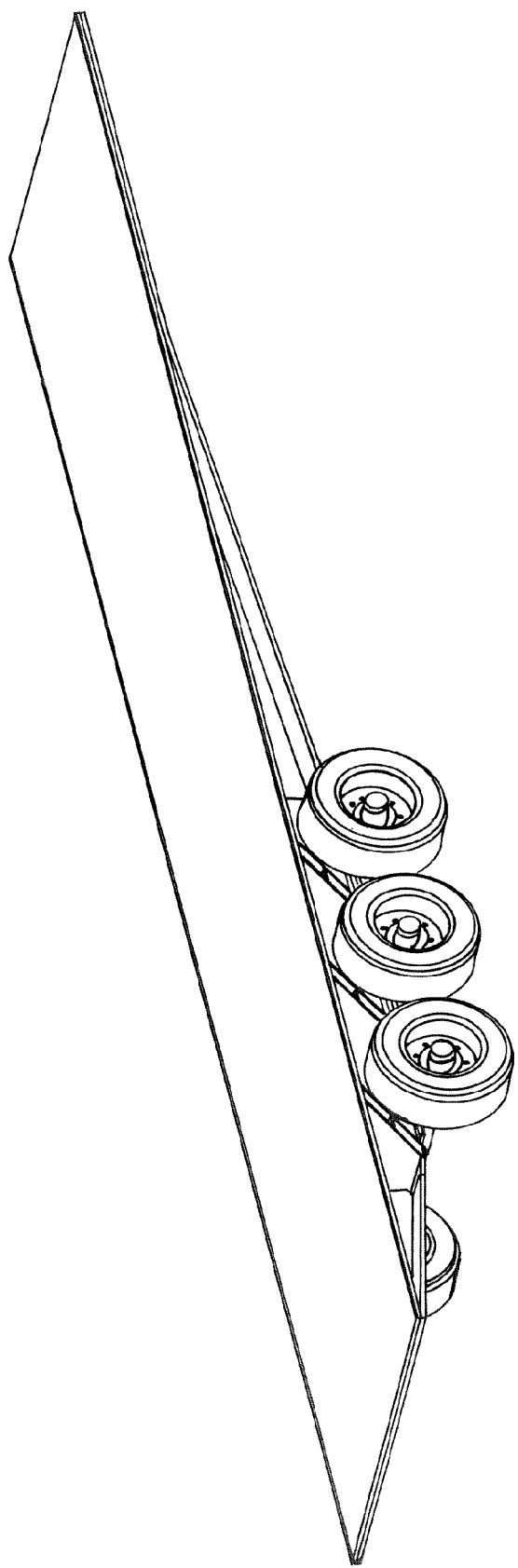

FIGS. 4a and 4b respectively show a view to the bottom and the top of a trailer comprising the support panel structure of this invention.

FIG. 5 shows a view to the interior of the support panel structure of this invention, showing the reinforcing structures.

FIG. 6 shows deformation of the reinforcing structures when a force or shock is applied.

FIG. 1 is a view to a top face of a layer of a support panel structure comprising the reinforcing structure. The reinforced layer is for example suitable for use in a support floor for a container or a housing. As can be seen from FIG. 1, the reinforcing layer shown comprises a part of the core material into which multiple reinforcing structures 12, 15, 35 and 36 have been inserted. A first reinforcing structure 15 extends in longitudinal direction of the support panel structure, to provide bending resistance and stiffness in longitudinal direction, a second 35 and third 12 reinforcing structure are built in in the vicinity of a rear part of the floor to increase the strength at the position where the majority of load is expected to occur, the strength and stiffness are further improved by the presence of two inserts 36 on opposite sides of the longitudinal axis of the support panel structure, which slant with respect to that longitudinal axis. Bending in the vicinity of the connection to the towing vehicle, in particular in longitudinal direction, is counteracted by the presence of a reinforcing structure in the front part 37 of the support panel structure. The structure shown in FIG. 1 may be sandwiched between a first and a second layer of a composite resin laminate as described above.

Figure 2:
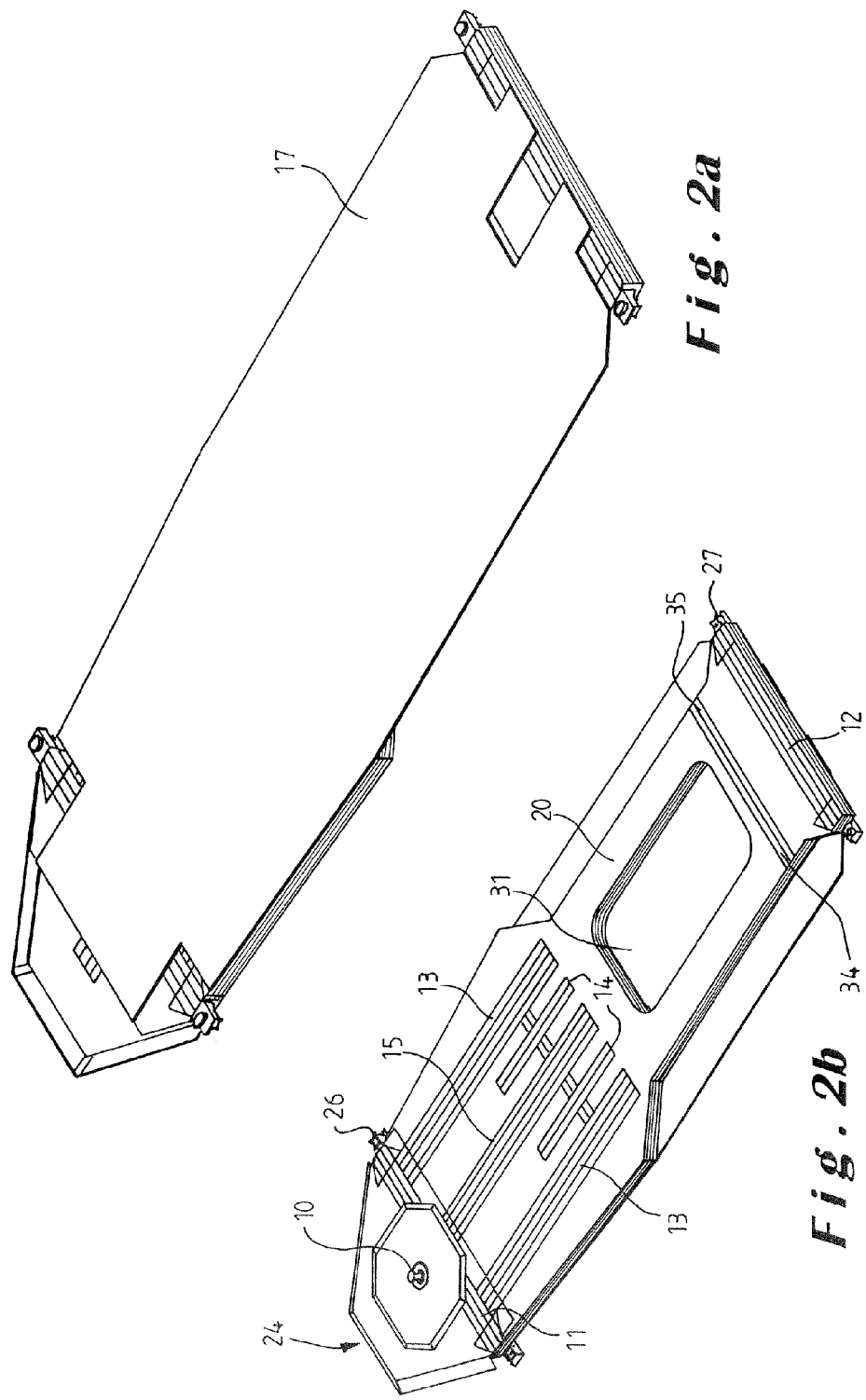
FIG. 2a shows a view to the top face of an embodiment of the support panel structure of the present invention.
FIG. 2b shows a view to the reinforced substructure mounted to the top face.

From FIG. 2 it appears that the support panel structure may comprise multiple stacked, interconnected layers, in particular a surface finishing layer 17, and multiple composite resin laminates. The lowest composite structure comprises a foamed core material 20, into which multiple reinforcing structures 11, 12, 13, 14, 15, 35 have been incorporated. A first reinforcing structure 15 is positioned substantially centrally in width direction of the support panel structure and extends from a front end 24 along the longitudinal axis of the support panel structure. This first reinforcing structure is provided to provide bending resistance at the position of the kink pin, where the support panel structure is connected to a towing vehicle. Additional reinforcing structures 13 and 14 improve bending resistance of the support panel structure mainly in longitudinal and cross direction but also in various other directions. Bending resistance at the position where a load may be connected to the support panel structure (26, 27) is provided by the presence of transversally extending reinforcing structures. The transverse reinforcing structures may extend over the whole width of the support panel structure or over part of its width only, depending on the bending resistance needed. Additional bending resistance may be provided at an additional support position 34 of the support panel structure by the presence of an additional transverse reinforcing structure. The top and bottom layer of the support structure shown in FIGS. 2a and 2b may comprise a composite resin laminate structure as described above bonded to the structure shown in FIGS. 2a and 2b to provide an extremely stiff structure.

As the support panel structure is an all composite structure, any connecting means for connecting a load to be supported by the support panel structure, may be built and integrated into the support structure in the process for producing the support panel structure.

FIG. 3 shows a possible embodiment of the support panel structure of FIGS. 2a and 2b, with composing parts taken apart. As can be seen from FIG. 3, a support panel structure may be built up of four panels, a top finishing layer 16, to which a first, second and third reinforced composite resin laminate panel is mounted. Thereby it is preferred that the first, second and third reinforced panel are interconnected as described above. The reinforcing structures provided in the first, second and third layer may be the same or different and may be positioned at the same or at different positions.

A preferred embodiment of a trailer comprising the support panel structure of the present invention is shown in FIGS. 4a and 4b.

The trailer 1 comprises a chassis 2, the rear part of which is supported by at least one set of wheels 8. The chassis is mounted to a bottom face of the above-described support panel structure. The chassis 2 comprises a first and a second longitudinal runner 3, 4 which may run over the entire length of the panel 10, but which preferably run only over part of the length of the panel to save weight. The load bearing capacity is mainly provided by the support panel structure. The longitudinal runners mainly function as a means for connecting the wheel axles to the chassis. Opposite longitudinal runners 3, 4 are connected by means of at least one cross tie 5, 6, 7, which each time are positioned in front of the wheel axles 9, to improve the stability of the trailer. The longitudinal runners 3, 4 and cross ties 5, 6, 7 are preferably made of composite material as it combines a high specific stiffness, good specific strength, fatigue strength, good impact properties, and vibration damping with light weigh with and good corrosion resistance. A possible way of constructing the longitudinal runners is disclosed in US2003/0184074 and EP-A-1.140.604 which are hereby incorporated by reference. A possible embodiment of the cross ties is disclosed in EP-A-1.140.604 which is also incorporated by reference.

Composites technology in general can be used to construct the longitudinal and transverse beams used in the trailer of this invention. It is possible to use processes such as hand lay-up, resin transfer moulding, continuous compression moulding, extrusion, filament winding and/or pultrusion, or combinations of both. The longitudinal runners will usually be made with the technique of continuous compression moulding, the cross ties will usually be made with the technique of filament winding although any other suitable technique may be used.

What is claimed is:

1. A support panel structure comprising at least one panel which extends in longitudinal and cross direction of the support panel structure and essentially forms one integrated structure, which integrated structure is at least partly build up of at least one composite resin laminate building block comprising at least a first and a second face sheet of a fibrous reinforced material with sandwiched in between a sheet of a foamed core material, wherein the first and second face sheet and the sheet of core material are mutually connected by means of fibrous reinforcing material at least part of which extends in height direction of the resin laminate building block, characterised in that the support panel structure comprises in height direction a multiplicity of composite resin laminate building blocks stacked on top of each other and bonded to each other, at least a first and a second superposed resin laminate building block sandwiching between them a layer of a foamed material, the resin laminate building blocks and foamed material being adhered to each other in such a way that they form one integrated structure and a stiff super sandwich assembly.

2. A support panel structure as claimed in claim 1, characterised in that the support panel structure comprises a multiplicity of composite resin laminate building blocks and additional sheets of foamed core material sandwiched between consecutive composite resin laminate building blocks, stacked on top of each other and bonded to each other to form a stiff super sandwich assembly.

3. A support panel structure as claimed in claim 2, characterised in that the multiplicity of the stacked composite resin laminate building blocks are over-wrapped with a fibrous reinforcing material and preferably impregnated with at least one resin.

4. A support panel structure as claimed in claim 1, characterised in that in the interior of at least one of the resin laminate building blocks at least one reinforcing structure is provided which extends in height direction and in at least one of the longitudinal and/or transverse direction of the support panel structure, which at least one reinforcing structure is provided to function as a reinforcement for the integrated structure to counteract bending of the support panel structure at least at the position of the reinforcing structure in at least one extending direction of the reinforcing structure.

5. A support panel structure as claimed in claim 4, characterised in that the support panel structure comprises at least a first and a second composite resin laminate building block sandwiching between them at least one layer of a foamed core material, in that in the interior of the first and second composite resin laminate building block respectively a first and a second reinforcing structure is provided, the first and second reinforcing structures being inserted at corresponding positions in height direction of the structure.

6. A support panel structure as claimed in claim 1, characterised in that in the vicinity of a position where a force is exerted to the panel, in the interior of at least one of the first and second composite resin laminate building block at least one third reinforcing structure is provided which extends in the direction of the force exerted to the panel, and at least one fourth reinforcing structure which extends in a direction perpendicular thereto.

7. A support panel as claimed in claim 6, characterised in that the support panel structure comprises a plurality of parallel extending third reinforcing structures next to one another, and a plurality of parallel fourth reinforcing structures next to one another.

8. A support panel structure as claimed in claim 4, characterized in that opposite longitudinal sides of the support panel structure comprise means for fastening a load to be carried by the support panel structure to it, and in that the at least one reinforcing structure extends at least partly between opposite fastening means and at least in one direction perpendicular thereto, in view of counteracting bending of the support panel structure at a position between the opposite fastening means.

9. A support panel structure as claimed in claim 4, characterized in that into the interior of the composite resin building block at least one reinforcing structure is provided which extends at least partly over a distance between a front and a rear end of the support panel structure.

10. A support panel structure as claimed in claim 4, characterized in that connecting means for connecting the support panel structure to a towing vehicle are integrated into the at least one panel.

11. A support panel structure as claimed in claim 10, characterized in that at least one reinforcing structure of a reinforcing material is integrated into the interior of the panel at the position of the connecting means, in that the at least one reinforcing structure extends mainly in a direction in which the support panel structure is to be towed and in at least one of two directions perpendicular to the towed direction.

12. A support panel structure as claimed in claim 11, characterised in that the integrated structure comprises at least a first and a second reinforcing structure which extend from a position shifted towards a front end of the support panel structure towards a central part thereof, and which slant with respect to the longitudinal axis of the support panel structure.

13. A support panel structure as claimed in claim 4, characterized in that the at least one reinforcing structure comprises a composite material.

14. A support panel structure as claimed in claim 1, characterized in that at least one hollow tube is integrated within the integrated structure.

15. A support panel structure as claimed in claim 1, characterised in that the foamed core material is a foamed plastic material, a foamed metal or a foam comprising a blend of both.

16. A trailer comprising a wheeled chassis mounted to a bottom face of a support panel structure as claimed in claim 1.

17. A trailer as claimed in claim 16, characterised in that the chassis comprises at least two opposite longitudinal runners made of a fibrous reinforced resin, at least one cross tie made of a fibrous reinforced resin having its opposite end parts connected to a side of the opposite longitudinal runners, the chassis further comprising at least one set of wheels (8) connected to each other by means of an axle (9), opposite end parts of the axle being suspended to opposite longitudinal runners.

18. A trailer as claimed in claim 7, characterised in that the axle and the axle suspension means are made of composite material.

\* \* \* \* \*